United States Patent Office 3,012,043
Patented Dec. 5, 1961

3,012,043
OXIDATION OF AROMATIC HYDROCARBONS
Dennis Albert Dowden and Alexander Muirhead Ure Caldwell, Norton-on-Tees, England, assignors to Imperial Chemical Industries Limited, London, England, a corporation of Great Britain
No Drawing. Filed June 19, 1958, Ser. No. 742,998
Claims priority, application Great Britain June 13, 1958
11 Claims. (Cl. 260—346.4)

This invention relates to processes for the oxidation of aromatic hydrocarbons to oxygen-containing organic compounds, and to catalysts therefor.

Processes for the oxidation of organic compounds, especially hydrocarbons, in the vapour phase by means of oxygen-containing gases in the presence or absence of catalysts, such as vanadia, are well-known, but have not proved entirely satisfactory, primarily due to the difficulties in avoiding combustion to carbon oxides, and in preventing the highly exothermic process from getting out of control. The present invention overcomes these disadvantages.

According to the present invention, there is provided a process for the oxidation of aromatic hydrocarbons to oxygen-containing organic compounds, which comprises passing an aromatic hydrocarbon in the vapour phase in admixture with a gas containing free oxygen at an elevated temperature over an oxidation catalyst comprising the metal salt of a compound comprising vanadium pentoxide in combination with a lower vanadium oxide in which the valency of vanadium is from 2 to 4.

The process of the present invention may be employed, for example, in the oxidation of toluene to benzoic acid; ortho-xylene or naphthalene to phthalic anhydride; meta or para-di-isopropyl benzene to meta or para-isopropyl benzoic acid; benzene to maleic acid or maleic anhydride.

In general, the oxidation reactions of the present invention are carried out at a temperature in the range of 300 to 550° C., the optimum temperature depending upon the starting material to be oxidised. Thus, the oxidation of naphthalene to phthalic anhydride is conveniently carried out at a temperature of the order of 425 to 450° C., while the oxidation of ortho-xylene to phthalic anhydride is conveniently carried out at temperatures of 450 to 500° C.

The oxidation reactions of the present invention may be effected by mixing the vaporised hydrocarbon with a gas containing free oxygen, air being conveniently employed as this gas, and bringing this mixture into contact with the catalyst maintained at an elevated temperature, as hereinbefore disclosed, at a space velocity in the range of 500 to 10,000 litres per litre of catalyst-filled space per hour.

If the oxidation process is to be carried out using a fluidized catalyst bed, it is convenient for the space velocity employed to be of the order of 1,000 litres per litre of catalyst-filled space per hour. On the other hand, if a fixed catalyst bed is used, the space velocity is conveniently of the order of 1,000 to 5,000 litres per litre of catalyst-filled space per hour.

The catalyst employed comprises a vanadyl vanadate (vanadico-vanadate or hypo-vanadato-vanadate) of a metal which is selected from thallium, silver, potassium, sodium, lithium, or rubidium, or a vanadyl vanadate of more than one of these metals.

By a vanadyl vanadate is meant a single solid phase, or a mixture of solid phases, produced by the processes hereinafter disclosed, each phase containing thallium, silver, potassium, sodium, lithium, or rubidium, together with oxides of vanadium, wherein at least a part of the vanadium atoms have a valency of 5 and the remainder have a valency of from 2 to 4. Preferably the molar ratio of the oxide of one of the metals disclosed to the vanadium pentoxide present in the catalyst lies between 0.001:1 to 0.3:1. For example, for thallium vanadyl vanadate, the molar ratio $Tl_2O:V_2O_5$ is conveniently 0.05:1.

Various methods may be used for preparing the catalysts; the following are given by way of example:

(1) A suitable metal compound may be fused with, say, vanadium pentoxide at about 700° to 800° C., and the fusion product cooled, during which oxygen is liberated. The cooled product may then be crushed, and the powder obtained may be used in this form. Alternatively, it may be coated on an inert support, for example silicon carbide, corundum or silica, by, for instance, producing a paste of the powder and using this to coat the particles of the support.

As another alternative the powder may be compressed into pellets, for example 3/16" in diameter and 3/8" in length, and employed in this form.

(2) The catalyst material, for example a vanadyl vanadate for potassium or thallium produced by the fusion process hereinbefore disclosed, may be re-melted, and a support, such as silicon carbide, corundum or silica, may be impregnated with it, by dipping the support one or more times into the melt. A catalyst prepared in this manner possesses a high resistance to abrasion. This is especially true in the case of thallium vanadyl vanadate or potassium vanadyl vanadate. The resistance to abrasion may be further improved by impregnating the support with a vanadyl vanadate melt, and, after cooling, tumbling the catalyst for a suitable time to dislodge any catalyst lumps adhering to the external surface of the support. The abrasion resistance of the catalyst mass is then similar to that of the support: furthermore, it has been shown that this treatment does not impair the catalyst activity.

As a modification of this method, a molten mass comprising fused vanadium pentoxide and the appropriate salt, for example, a potassium or thallium salt, preferably potassium carbonate or thallium carbonate, may be produced and the support dipped into this melt before the evolution of oxygen and the formation of a vanadyl vanadate. The oxygen evolved during solidification and formation of a vanadyl vanadate assists the formation of a porous vanadyl vanadate structure within the pores of the support.

It is catalysts produced by this process (2) which are particularly suitable for use in fluidized bed operation, since the catalysts in question have a high resistance to abrasion.

The catalysts produced by the methods (1) and (2) are preferably employed in the form of particles or pieces which have sizes within a relatively narrow range. If it is desired to operate with the catalyst in a very finely divided form, the particles should be capable of retention by a 1/32" sieve, but able to pass a 3/64" sieve. If a catalyst in the form of larger granules is preferable, these granules may conveniently grade between 1/8" and 3/16".

Other methods may be used for preparing catalysts for use in the present invention, although these methods are less important than those described above. They include, for example, the preparation of sodium divanadyl vanadate as follows: 12 grams of vanadium pentoxide are reduced with excess of a saturated solution of sulphur dioxide in sulphuric acid, and the excess $SO_2$ is expelled by boiling. The hot solution is mixed with 6 grams of vanadium pentoxide in sodium hydroxide, and after standing for several days is acidified with acetic acid and mixed with a cold saturated solution of sodium acetate. The resulting crystals of sodium di-vanadyl vanadate are washed with aqueous sodium acetate and with alcohol.

In carrying out the process of the present invention, it is frequently preferable to operate for the first few hours at a temperature higher than that at which it is ultimately desired to work. For example, in the oxidation of naphthalene to phthalic anhydride, initial operation at 450° C. is advantageous, if it is desired to operate eventually at 425° C. After carrying out the oxidation for 8 hours at 450° C., the temperature may be decreased to 425° C. The catalyst activity does not fall accordingly, but remains substantially at the value attained at 450° C., insofar as phthalic anhydride production is concerned. There is, however, less tendency at 425° C. than at 450° C. for undesirable combustion of the naphthalene to carbon oxides and water.

*Example 1*

1.29 gm. of thallium carbonate and 10 gm. of vanadium pentoxide were ground together and fused. The melt was agitated for some time to ensure homogeneous mixing and then allowed to cool. During the cooling stage, oxygen was evolved. The thallium vanadyl vanadate thus formed was re-melted; particles of alpha alumina were dipped into the melt, quickly withdrawn and allowed to drain. The particles of alpha alumina employed in this process were of a size which enabled them to be retained by a ⅛″ sieve but to pass a 3/16″ sieve. The dip procedure was repeated until the alpha alumina was fully impregnated with thallium vanadyl vanadate. The weight of thallium vanadyl vanadate incorporated into the alpha alumina was between 5 and 10%. The catalyst was tumbled for one hour to remove any excess vanadyl vanadate adhering to the external surfaces. After this treatment, the abrasion resistance of the catalyst mass became similar to that of the support.

A mixture of 21.2 grams of ortho-xylene vapour and 480 litres of air was passed over 50 mls. of the thallium vanadyl vanadate supported on alpha alumina prepared as described above. The catalyst bed occupied a 3″ length of a rector tube, 30″ long and 1.25″ in diameter, and was heated electrically. At an operating temperature of 500° C., ortho-xylene was converted to phthalic anhydride with a conversion of 64.1% and a pass yield of 35.5%.

*Example 2*

2.34 gm. of potassium carbonate and 10 gm. of vanadium pentoxide were ground together and fused. The melt was agitated for some time to ensure homogeneous mixing and allowed to cool. During the cooling stage, oxygen was evolved. The potassium vanadyl vanadate thus formed was ground to pass a 100 B.S.S. sieve and pelleted at a pressure of 20 tons per square inch to give pellets 3/16″ in diameter and ⅜″ in length.

A reaction was carried out using a mixture of ortho-xylene and air as described in the previous example except that the reaction temperature was 490° C. The conversion of ortho-xylene was 66.5% and the pass yield of phthalic anhydride was 38.9%.

When using a pure vanadium pentoxide catalyst, the conversion of ortho-xylene obtained under the same conditions of operation was 68.8% whereas the pass yield was only 29.5%.

*Example 3*

20 mls. of a catalyst comprising thallium vanadyl vanadate supported on alpha alumina, prepared as described in Example 1, was charged to a reactor and an air-naphthalene mixture (air:naphthalene volume ratio 20.3:1) was passed over it at a rate of 5,000 litres per hour per litre of catalyst-filled space, the catalyst being maintained at a temperature of 446° C. The amount of naphthalene converted was found to be 44.4% and the pass yield of phthalic anhydride was 33.5%. The pass yield of ultimate conversion products, that is $CO_2+CO+H_2O$, was 2.6%.

For comparison, the same reaction was carried out using a catalyst comprising fused vanadium pentoxide supported on alpha alumina; conditions of operation were otherwise identical. The naphthalene conversion was 89% and the phthalic anhydride pass yield was 43.7%. The pass yield of ultimate oxidation products, that is $CO_2+CO+H_2O$, was 34.1%.

*Example 4*

Example 1 was repeated using 0.774 gm. of thallium carbonate and 10 gm. of vanadium pentoxide. As before, the catalyst produced contained between 5 and 10% of thallium vanadyl vanadate based on the weight of alpha alumina. The catalyst was again tumbled for 1 hour to remove any excess of thallium vanadyl vanadate adhering to the external surfaces, and after this treatment the abrasion resistance and strength of the catalyst mass were similar to those of the alpha alumina.

This catalyst was tested by charging 20 ml. of it to a metal reactor and passing an air-naphthalene mixture, with an air:naphthalene volume ratio of 20:1, over it at a space velocity of 5,000 litres per litre of catalyst-filled space per hour. The temperature of the catalyst was maintained at 425° C. 84% of naphthalene was converted, the pass yield of phthalic anhydride being 54%. The pass yields of by-products were:

| | Percent |
|---|---|
| Phthalic acid | 0.1 |
| Maleic acid | 4 |
| Benzoic acid | 4 |
| 1:4 naphthaquinone | 4 |
| $CO_2+CO+H_2O$ | 19 |

In order to carry out a comparative experiment, alpha alumina was impregnated with a solution of vanadyl chloride and the product was calcined in steam. A catalyst was obtained which contained 6–7% by weight of vanadium pentoxide. By the process described earlier in this example, 20 ml. of this catalyst were used in the oxidation of naphthalene. The conditions employed were exactly the same as those previously given. 99.3% of the naphthalene was converted to phthalic anhydride, the pass yield of which was 49%. The pass yields of by-products were:

| | Percent |
|---|---|
| Phthalic acid | 2.5 |
| Maleic acid | 7.0 |
| Benzoic acid | 2.5 |
| 1:4 naphthaquinone | 0.2 |
| $CO_2+CO+H_2O$ | 40.5 |

In particular it will be noted that the quantity of $CO_2+CO+H_2O$ was more than twice the amount previously produced.

*Example 5*

A catalyst was produced, exactly as described in Example 1 using 0.258 gm. of thallium carbonate and 10 gm. of vanadium pentoxide.

This catalyst was tested exactly as described in Example 3 except that the temperature of operation was 450° C. 97% of the naphthalene was converted, the pass yield of phthalic anhydride being 70%. The pass yields of by-products were:

| | Percent |
|---|---|
| Phthalic acid | 1 |
| Maleic acid | 8 |
| Benzoic acid | 4 |
| 1:4 naphthaquinone | 2.5 |
| $CO_2+CO+H_2O$ | 14 |

A comparative example was carried out exactly as described in Example 3. 99.5% of the naphthalene was converted, the pass yield of phthalic anhydride being 40%. The pass yields of by-products were:

| | Percent |
|---|---|
| Phthalic acid | 1.5 |
| Maleic acid | 7.0 |
| Benzoic acid | 2.5 |
| 1:4 naphthaquinone | 0.2 |
| $CO_2+CO+H_2O$ | 51 |

From these results it is evident that the quantity of $CO_2+CO+H_2O$ was between 3 and 4 times as great when using a conventional catalyst.

*Example 6*

A catalyst was produced from 0.774 gram of thallium carbonate and 10 gm. of vanadium pentoxide by the process identical with that used in Example 1. This catalyst was used in the oxidation of naphthalene, the conditions being identical with those employed in Example 3. 97% of naphthalene was converted, the pass yield of phthalic anhydride being 64% and the pass yields of byproducts were:

| | Percent |
|---|---|
| Phthalic acid | 0.1 |
| Maleic acid | 5 |
| Benzoic acid | 2.5 |
| 1:4 naphthaquinone | 3.5 |
| $CO_2+CO+H_2O$ | 25 |

*Example 7*

Silver carbonate (0.104 gm.) and vanadium pentoxide (10 gms.) were ground together and fused. The melt was agitated to ensure homogeneous mixing, and then allowed to cool. The silver vanadyl vanadate thus formed was re-melted. Particles of porous alpha alumina, capable of passing a 3/16" sieve, but of being retained by a 1/8" sieve, were dipped into the melt, quickly withdrawn and allowed to drain. This procedure was repeated five times, the internal pore structure of the support being impregnated in this way with silver vanadyl vanadate. The weight of silver vanadyl vanadate incorporated into the alpha alumina in this manner was 5%. This material was tumbled for 1 hour to remove any silver vanadyl vanadate adhering relatively loosely to the surface.

20 ml. of this catalyst were charged to a metal reactor and a mixture of air and naphthalene in a volume ratio of 20:1 were passed over the catalyst at a space velocity of 5,000 litres per litre of catalyst-filled space per hour. The catalyst was maintained at a temperature of 420° C. Of the naphthalene passed through the reactor, 78% was converted, the pass yield of phthalic anhydride being 46%.

A second sample of catalyst was heated at 450° C., the air-naphthalene gas mixture being passed through as before. The temperature was lowered after 8 hours to 420° C.; at this temperature the conversion of the naphthalene was 84% and the pass yield of phthalic anhydride was 59%. The improvement resulting from the activation process is very noticeable.

Similarly, a catalyst activated as in the preceding paragraph at 450° C. was employed under the conditions described above for naphthalene oxidation at 400° C. The conversion of naphthalene was 65% and the pass yield of phthalic anhydride was 50%. When using an unactivated catalyst at 400° C. the conversion of naphthalene was only 10% and the pass yield of phthalic anhydride was 3.3%.

We claim:

1. A process for the oxidation of aromatic hydrocarbons to oxygen-containing organic compounds selected from the class consisting of carboxylic acids and anhydrides, which comprises passing an aromatic hydrocarbon, selected from the class consisting of mono- and di-cyclic aromatic hydrocarbons, in the vapor phase in admixture with a gas containing free oxygen at an elevated temperature from 300° to 550° C. over a fused oxidation catalyst consisting essentially of the metal salt of a compound consisting essentially of vanadium pentoxide in combination with a lower vanadium oxide in which the valency of vanadium is from 2 to 4, wherein said metal is selected from the class consisting of thallium, silver, potassium, sodium, lithium, and rubidium, and wherein the molar ratio of this metal, expressed as its oxide $M_2O$, to vanadium oxide expressed as vanadium pentoxide, lies in the range of 0.007:1 to 0.05:1.

2. A process as claimed in claim 1 in which toluene is oxidised to benzoic acid.

3. A process as claimed in claim 1 in which a hydrocarbon selected from the group consisting of ortho-xylene and naphthalene is oxidized to phthalic anhydride.

4. A process as claimed in claim 1 in which meta-diisopropyl benzene is oxidised to meta-isopropyl benzoic acid.

5. A process as claimed in claim 1 in which para-diisopropyl benzene is oxidised to para-isopropyl benzoic acid.

6. A process as claimed in claim 1 in which benzene is oxidised to an oxygen-containing organic compound selected from the group consisting of maleic acid and maleic anhydride.

7. A process as claimed in claim 1 in which a mixture of air and the vapourised aromatic hydrocarbon is contacted with the catalyst at a space velocity in the range of 500 to 10,000 litres per litre of catalyst-filled space per hour.

8. A process as claimed in claim 1 in which the reaction is operated with the catalyst maintained in a fluidized state, the space velocity being of the order of 1,000 litres per litre of catalyst-filled space per hour.

9. A process as claimed in claim 1 in which the catalyst is employed in the form of a fixed bed and the gas space velocity is of the order of 1,000 to 5,000 litres per litre of catalyst-filled space per hour.

10. A process as claimed in claim 1 in which the catalyst has a size within a relatively narrow range extending from 1/32" to 3/64" for particles to 1/8" to 3/16" for granules.

11. A process as claimed in claim 1 in which the oxidation reaction is operated for the first few hours at a temperature higher than that at which it is subsequently desired to work, whereby the catalyst is activated.

References Cited in the file of this patent

UNITED STATES PATENTS

| 1,764,023 | Jaeger | June 17, 1930 |
| 1,809,752 | Jaeger | June 9, 1931 |
| 1,900,648 | Jaeger | Mar. 7, 1933 |
| 1,909,354 | Jaeger | May 16, 1933 |
| 2,081,272 | Foster | May 25, 1937 |
| 2,180,353 | Foster | Nov. 21, 1939 |
| 2,206,377 | Weiss | July 2, 1940 |
| 2,604,479 | Rollman | July 21, 1952 |

OTHER REFERENCES

Canneri et al.: Gazz. Chim. Ital., vol. 58 (1928), pages 6–25.